Nov. 8, 1966  V. J. AZBE  3,284,075
LIME PRODUCTION
Filed March 18, 1963  5 Sheets-Sheet 1

Victor J. Azbe,
Inventor.
Koenig, Pope, Sennigr and Powers,
Attorneys.

Nov. 8, 1966    V. J. AZBE    3,284,075
LIME PRODUCTION
Filed March 18, 1963    5 Sheets-Sheet 2

Victor J Azbe,
Inventor
Koenig, Pope, Sennigar and Powers,
Attorneys.

Nov. 8, 1966  V. J. AZBE  3,284,075
LIME PRODUCTION
Filed March 18, 1963  5 Sheets-Sheet 3

Victor J. Azbe,
Inventor.
Koenig, Pope, Senniger and Powers,
Attorneys.

Nov. 8, 1966  V. J. AZBE  3,284,075
LIME PRODUCTION
Filed March 18, 1963  5 Sheets-Sheet 4
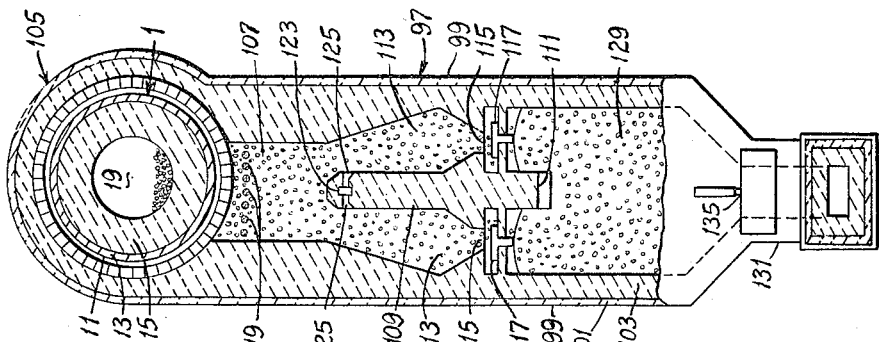
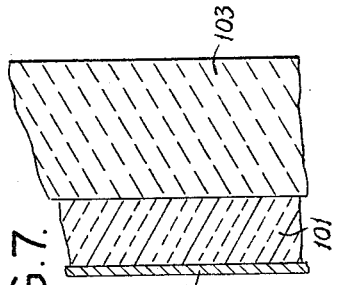
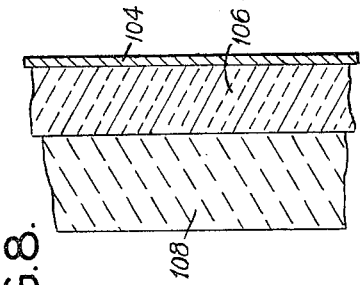
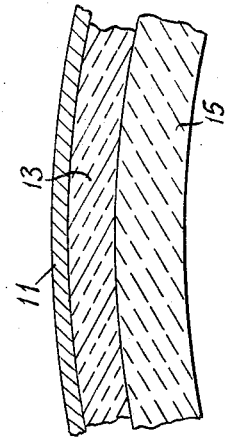
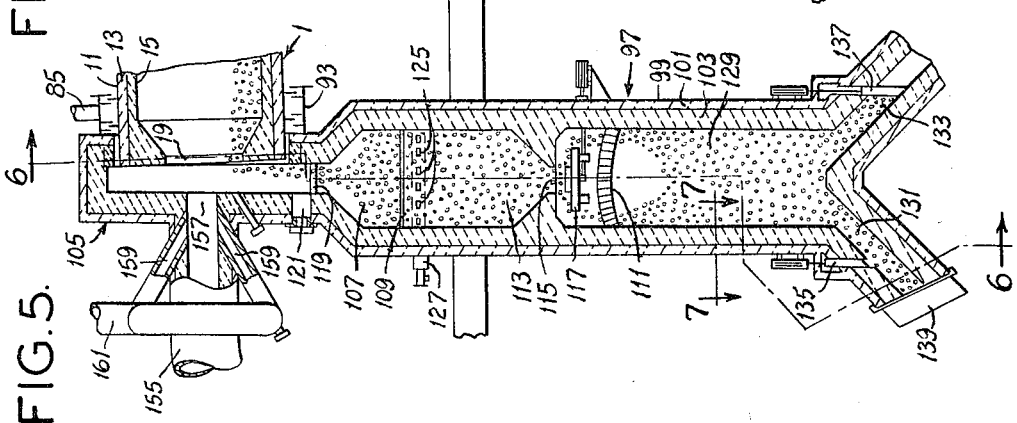
Victor J. Azbe,
Inventor.
Koenig, Pope, Senniger and Powers,
Attorneys.

Nov. 8, 1966 V. J. AZBE 3,284,075
LIME PRODUCTION
Filed March 18, 1963 5 Sheets-Sheet 5

Victor J. Azbe
Inventor.
Koenig, Pope, Senniger and Powers,
Attorneys.

United States Patent Office 3,284,075
Patented Nov. 8, 1966

3,284,075
LIME PRODUCTION
Victor J. Azbe, Clayton, Mo., assignor to Azbe Corporation, Clayton, Mo., a corporation of Missouri
Filed Mar. 18, 1963, Ser. No. 265,781
31 Claims. (Cl. 266—13)

This invention relates to apparatus adapted to employ waste heat, from steel manufacturing apparatus and the like for making lime to be used in such apparatus, or to be used elsewhere.

Among the several objects of the invention may be noted the provision of apparatus adapted effectively to use waste heat which may be intermittently obtained in varying amounts at varying temperatures, for producing and using high-grade lime; the provision of such apparatus which effect substantial economies in the manufacturing processes in which waste heat is evolved; the provision of apparatus of the class described adapted to produce soft burned and reactive lime such as desired for steel manufacture; the provision of apparatus of the class described by means of which lime as it is manufactured may be immediately introduced in appropriate increments to discontinuous processes requiring lime, such as for example the process of making steel by the basic oxygen process; and the provision of a coordinated system for lime and steel manufacture whereby waste heat obtained intermittently from a steel furnace is employed directly to the manufacture of lime in amounts needed for use in the furnace. Other objects and features will be in part apparent and in part pointed out hereinafter.

The invention accordingly comprises the elements and combinations of elements, features of construction and manipulation, and arrangements of parts which will be exemplified in the constructions hereinafter described, and the scope of which will be indicated in the following claims.

In the accompanying drawings, in which several of various possible embodiments of the invention are illustrated, FIG. 1 is a side elevation illustrating one form of the invention;

FIG. 5 is a further enlarged sectional view of certain terminal calcining and storage elements shown in section at the left in FIG. 2;

FIG. 6 is a jogged vertical section taken one line 6—6 of FIG. 5;

FIG. 7 is an enlarged horizontal detail cross section taken on line 7—7 of FIG. 5;

FIG. 8 is an enlarged horizontal detail cross section taken on line 8—8 of FIG. 4;

FIG. 9 is an enlarged vertical detail cross section taken on line 9—9 of FIG. 2;

Figure 1:
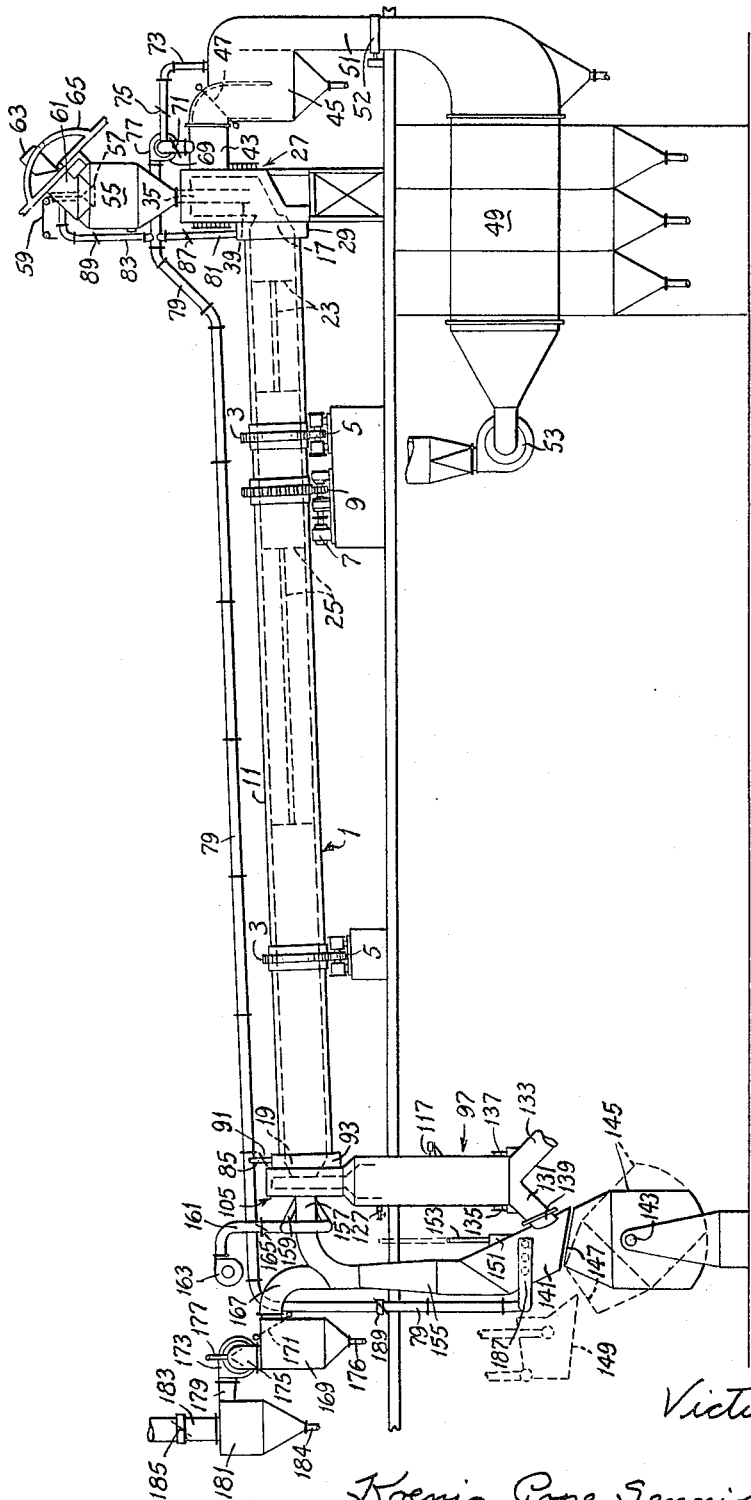

Corresponding reference characters indicate corresponding parts throughout the several views of the drawings. FIGS. 7, 8 and 9 are on a scale such that the thicknesses of certain outer steel members can be indicated by double lines, which is not practicable in the remaining small-scale figures, wherein single lines are employed for the purpose.

Heretofore, rotary lime kilns have been constructed to operate substantially at a continuous rate, employing a combustible fuel especially fired for heating the kiln. The product (lime) was taken from the kiln and stored for subsequent use. According to the present invention, the rotary kiln and its process of operation are adapted for the use of a substantial amount of waste heat, such as may be obtained in variable quantities from other apparatus and processes, for example from steel making furnaces or the like. The rotary kiln and its use are also adapted to supply lime, as made, directly to the apparatus or process supplying the waste heat, where such apparatus or process requires lime to be supplied thereto.

Figure 2:
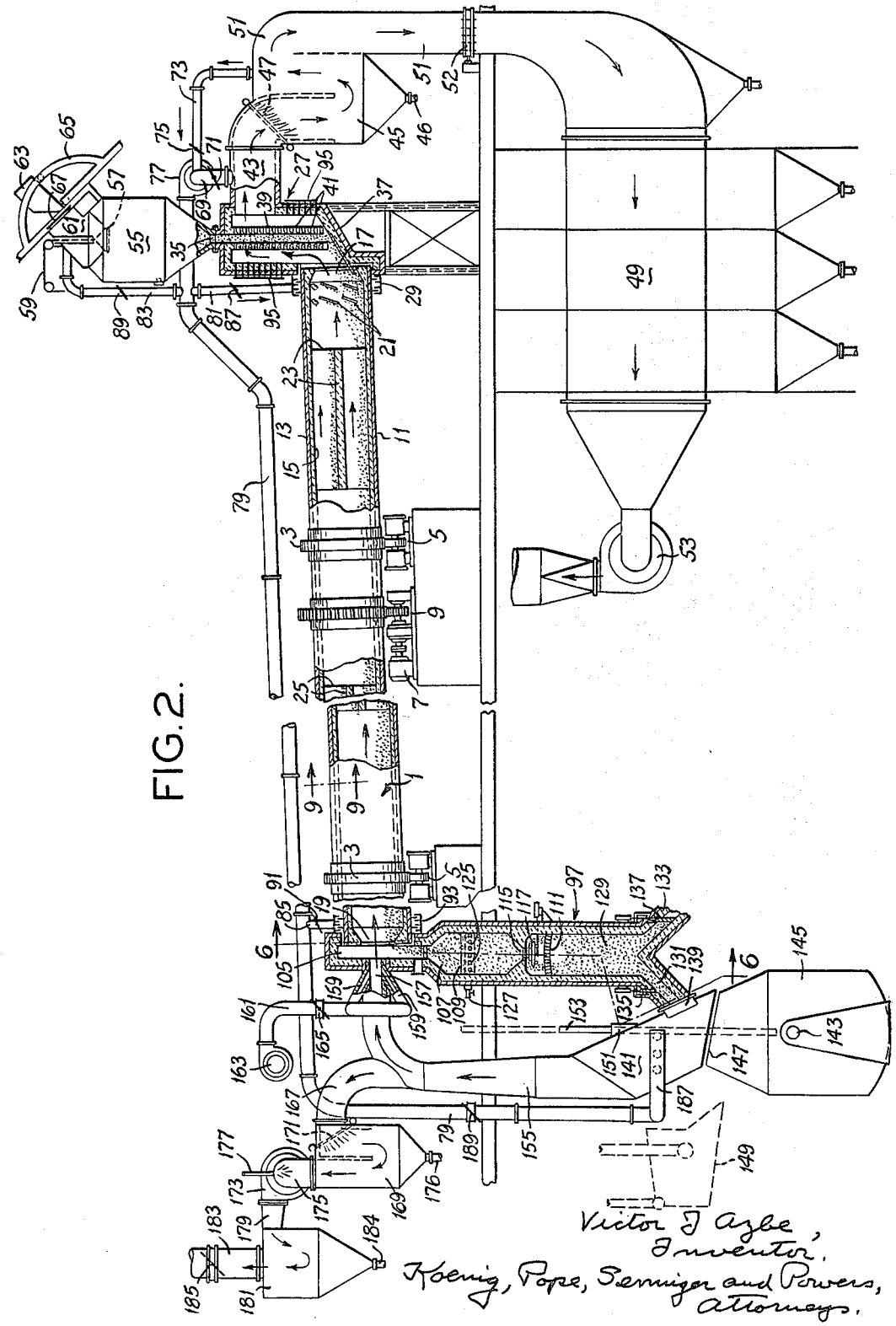
FIG. 2 is an enlarged side elevation, like FIG. 1, but having some parts broken away and illustrated in vertical section.

Referring now to FIGS. 1 and 2 of the drawings, numeral 1 indicates a hollow counterflow type of rotary drum carried by attached circular supporting bands 3. The bands are supported for rotation on idler rollers 5. Variable-speed rotation is effected by a variable-speed motor 7 through a gear drive 9. As shown in FIG. 9, the drum is composed of exterior steel shell 11, containing on its inside and throughout its entire length a thick layer of compressively strong heat insulation 13 such as an aluminous insulation. Carried on the interior surface of the insulation 13 throughout its length is a thick layer of so-called basic firebrick lining 15 which may be magnesite brick. The drum wall is thus construtced so that the heavy basic brick lining constitutes a large heat sink or accumulator throughout the drum length, which may be drawn upon at any point in the kiln for heating under circumstances which will appear. Basic brick readily absorbs and gives up large amounts of heat. Heretofore rotary kiln drums have not been built with such functions in mind. Such prior drums were not intended and therefore not adapted to have their brick linings operate as an effective heat sink or reservoir of heat for the purposes set forth below.

The drum 1 slopes downward from an upper opening 17 to a lower opening 19. The upper opening 17 constitutes a stone inlet and a gas outlet. The lower opening 19 constitutes a stone outlet and a gas inlet. A counter flow of stone and gas occurs within the drum. The stone supply is crushed limestone ($CaCO_3$).

Adjacent the stone inlet 17 are conventional skew flights 21 for downwardly advancing the stone as received through the opening 17. Spaced inwardly from the flights 21 are cross walls 23 which lift, tumble and expose the stone as it progresses downwardly, thus providing what may be referred to as a preheating sector in the drum. A mid sector is also established by additional cross walls 25 which further tumble and expose all of the stone. The cross walls 23 and 25 are constructed of suitable refractory material, basic or possibly Carborundum brick, so that they also function as heat sinks or accumulators. A substantial amount of calcination occurs in this mid sector. Further calcination occurs during the traverse of the stone from the mid sector to the lower opening 19. However, calcination is not permitted to be completed in the drum 1, whereby the drum contains along its length a substantial amount of calcareous stone core material which also functions as a heat accumulator.

Figure 4:
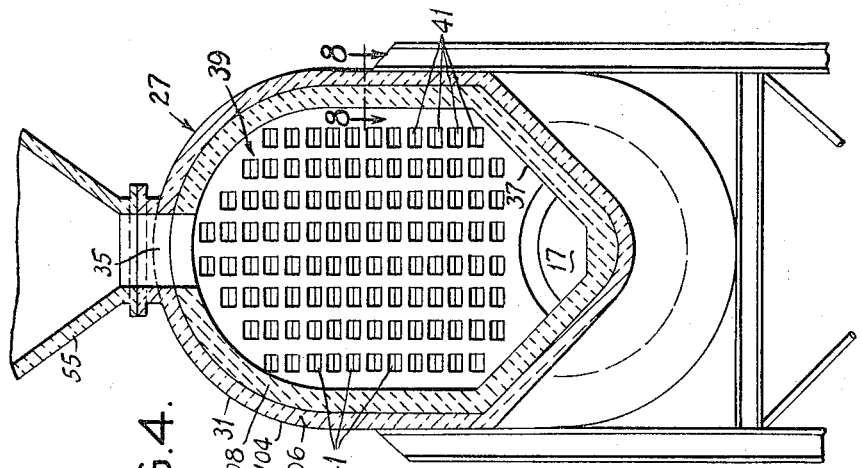
FIG. 4 is a jogged vertical section taken on line 4—4 of FIG. 3.
Figure 3:
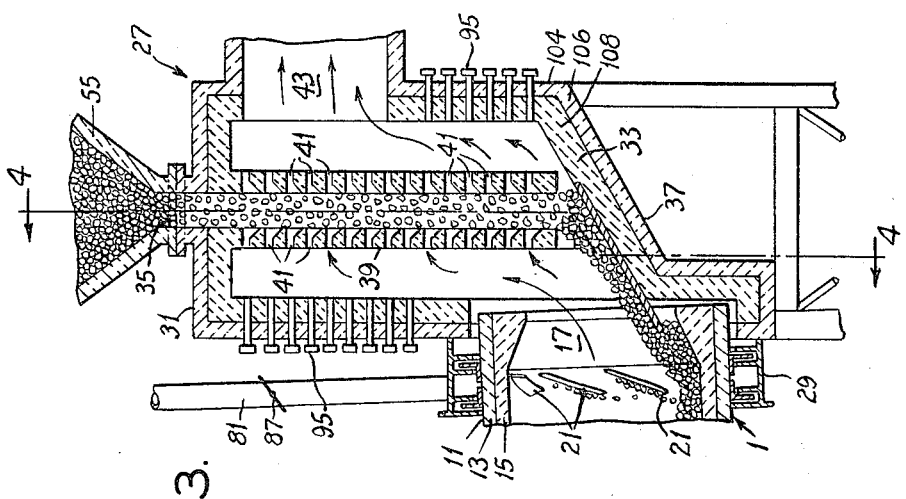
FIG. 3 is a further enlarged sectional view of certain stone perheater elements shown in section at the right in FIG. 2.

Adjacent to and feeding the opening 17 is a stationary stone preheater 27. A running connection is effected with the drum 1 by means of a labyrinth type running seal 29. The preheater 27 is in the form of an upright chamber formed by a housing 31. Further details are shown in FIGS. 3, 4 and 8. As shown in FIG. 8, heater 27 has an outer steel wall 104 within which is a lining layer of compression-resisting insulation 106. Inside the liner 106 is a thick liner of suitable firebrick 108. The housing 31 has an upper stone inlet 35 and a sloping bottom 37. It also contains a foraminated hollow cross wall 39 in which are cross ports 41. Stone descends through the hollow wall and is fed into the stone inlet 17, as indicated in FIG. 3. Gas in moving out from the drum 1 passes through the wall ports 41 and the stone progresses down through the wall. This preheats the stone to calcining temperature. After passing through the wall 39, the gas moves through an outlet 43 (FIG. 2). The bottom slope 37 is at an angle, inducing free flow into the kiln. If desired, a conventional reciprocating or shaking device may also be provided to promote flow. The structure as a whole may be called a cross-flow stone preheater.

The gas outlet 43 is connected with a cooling unit 45 through an interconnected water-cooling spray assembly 47. The gases flow from the spray assembly to an electrostatic dust-collecting precipitator 49 via cool-gas connection 51, within which is located the kiln main control damper 52. Other dust collectors may be substituted for the electrostatic precipitator. An exhaust fan 53 induces gas flow through the entire calcining system and the precipitator. Only cool products of combustion reach the precipitator 49, such as nonflammable $CO_2$, $N_2$ and some trace gases. As will be explained below, air is excluded from access to the precipitator.

Attached to the inlet 35 is a limestone hopper 55 at the inlet of which is a charging bell 57. The bell 57 is intermittently operated as required from a control mechanism 59. Crushed stone is supplied through a sliding type of inlet door 67 of a gas-lock chamber 61. This is accomplished by means of a skip bucket 63 operated from a skip hoist mechanism 65. Except when receiving stone, the door 67 is closed. The bell 57 is preferably shut whenever the door 67 is open, and is preferably opened only when the door is closed, for reasons which will appear.

At numeral 69 is shown a hot-gas offtake from the hot-gas outlet 43. In it is a control damper 71. At numeral 73 is shown a cool-gas offtake from the connection 51. In it is a control damper 75. Both of the offtakes 69 and 73 are connected to the inlet of a fan 77 which is thus capable of delivering temperature-controlled products of combustion to a recirculating spent-gas pipe 79. Temperature control is effected by means of the dampers 71 and 75. In view of the above, it will be seen that the organization of the hot-gas outlet 43, cool-gas connection 51, interposed water cooler 47, pipes 69, 73 and their respective controls 71 and 75, constitute means whereby spent gases from the upper end of the drum 1 may have a portion thereof abstracted and sent to the spent-gas pipe 79 with temperature control thereof as delivered to the pipe.

The spent recirculating gas from pipe 79 is employed both for internal pressurization of the labyrinth system to prevent leakage either way across the seal and also to dilute and modulate the temperatures of waste gases used for heating, as will be explained below. Pressurization is accomplished by pipes 81, 83 and 85, containing suitable dampers 87, 89 and 91, respectively. Pipe 81 leads to the seal 29 to pressurize it with products of combustion so as to prevent inward air leakage therethrough. Pipe 85 for like purpose is connected with a running labyrinth seal 93 around the opening 19 of the drum 1. The pipe 83 connects with the gas-lock chamber 61 of the hopper 55, thereby internally pressurizing it with products of combustion and preventing inward access of air when the charging door 67 is open, or inward air leakage when closed. Thus there will be no appreciable leakage of air into the system such as might reach the electrostatic precipitator 49. It will be noted that the cool temperature-modulated condition of the gas from pipe 79 also prevents destructive heating of the fan and of the seals 29 and 93.

Connected at the lower opening 19 of the drum 1, by means of the seal 93, is a hollow structure or terminal calcining and storage assembly 97. This is shown in general toward the left in FIGS. 1 and 2 and more particularly in FIGS. 5–7. It has an outer steel jacket 99 within which is a thick layer of insulation 101 and an inner lining of suitable firebrick 103 (see FIG. 7).

The assembly 97 has an upper firing hood or receiver 105 connected with the lower end of the drum 1 by the running seal 93. The hood 105 opens downward into a fired terminal calcining section 107. Grates 119 are provided for catching incidental large clinkers, which may be removed through side doors 121. Below the section 107 the assembly 97 is divided by a cross wall 109 supported on an arch 111. The wall forms two conduits 113 for the passage of lime primarily. These conduits form a terminal calcining heat-soaking section. Conduits 113 have lower outlets 115. A shaking outlet control 117 is provided for each outlet 115. The section 107 and passages 113 form an upper calcining chamber.

Extending along the top margin of the wall 109 is a firing passage 123 having lateral ports 125 for firing the terminal calcining section 107. Connected with the firing passage 123 is variable premixing air and fuel burner 127, adapted to introduce fuel such as oil or natural gas, with sufficient air for burning. Thus any uncalcined material that descends from the lower end of the drum 1 is further calcined by the firing effect at and above the firing ports 125. Spent gases from calciner 107 are convected up to the drum 1 through the hood 105 where they have a tempering effect on excessively hot oxygen furnace gases, mentioned below. As material moves through the conduits 113, it is not subjected to further firing but it calcines further by a heat-soaking action, so that by the time it passes out through the outlet controls 117 it is substantially completely calcined. By heat-soaking is meant the spontaneous transfer of heat from overheated surfaces or overheated pebbles to unfinished calcareous core material which thus converts to finished lime.

The finished hot lime finally passes down into the storage portion 129 of the assembly 97 for storage while hot. This lower section 129 may be referred to as the hot lime storage pit. The pit 129 has two outlets 131 and 133 for finished lime. These are under control of gates 135 and 137, respectively. The outlet 133 is for withdrawing any lime that may be in excess of that required from passage 131. The passage 131 extends to an inlet collar 139, located on the side of a gas collector hood 141. The lower open end of the hood is located above a basic oxygen furnace 145. The furnace 145 is swung on a pivot 143 for movement between the solid- and dotted-line positions shown in FIG. 1. When the gate 137 is open as shown in FIG. 2, a portion of finished hot lime will gravitate into furnace 145, assuming the furnace to be in its upright solid-line position. In its dotted-line position the furnace is adapted to be charged through its open mouth 147 from a pouring ladle 149. When in the solid-line position, the mouth 147 of the ladle registers with the lower opening in the hood 141.

On one side of the hood 141 is a collar 151 in which slides a conventional oxygen lance 153 in a manner such that it can be inserted into the furnace 145 for the introduction of oxygen, or for withdrawal therefrom, as indicated in FIG. 2. When the lance 153 is moved down into the steel furnace 145, oxygen is forced in. This brings about reactions in the charge within the furnace with the generation of substantial amounts of hot combustible gas which is substantially CO. This rises through the collecting hood 141 and moves through a riser pipe connection 155 to a firing port 157 in the hood 105. Connected with the inlet port 157 is a bank of air injection nozzles 159 which are served with air through a connection 161 from an air fan 163. A control damper 165 is located in connection 161. The air projected from nozzles 159 injects itself with the CO gas from riser 155. Thus combustion from CO to $CO_2$ is completed in a flame extending axially into the drum from the firing port 157. It will be understood that the CO gas which emerges from the port 157 is hot enough for combustion to $CO_2$ when met by the incoming air from the air injection nozzles 159. The air injection process is such as to delay mixing of gases so that the combustion is gradual and continues throughout a substantial length of the drum.

The heat required for calcination in the drum 1 by the highly heated gases is provided primarily by combustion of hot waste gas generated by the oxidation process in furnace 145. The spent gases received at drum opening 19 from the fuel-fired ports 125 after these gases have performed their terminal calcining effect upon the material flowing down from the hood 105 exert a tempering effect on the gases entering opening 19 from the furnace 145.

As will appear below in the description of operation, conditions occur in which it is desired that under certain circumstances not all, and under other circumstances none of the gas moving through the connection 155 should flow to the drum 1. Therefore, provision is made for abstracting the excess through a gas relief system shown at the left in FIGS. 1 and 2. This system comprises a branch outlet relief pipe 167 extending from the riser pipe 155. Pipe 167 has a connection with a cooler 169 in which is located a bank of water sprayers 171. Cooled gas is abstracted from the cooler 169 by a fan 173 having a connection 175 for the purpose. Water is withdrawn at 176. In the connection 175 is an additional water sprayer 177. The outlet of the fan 173 has a connection 179 with a wet dust collector 181, the outlet 183 of which conveys away cooled excess gas. Sludge is removed at 184. In the outlet 183 is a control damper 185.

As shown in FIGS. 1 and 2, the recirculating gas pipe 79 extends to an inlet connection 187 with the collector hood 141, a damper 189 being interposed ahead of the connection. The gases rising from furnace 145 through connection 155 may be modulated both as to temperature and dilution of combustible CO by the spent recirculating $CO_2$ and $N_2$ gas from pipe 79. The temperature is controlled by dampers 71 and 75. Dilution is controlled from spent-gas volume control damper 189.

It will be understood that, if desired, gas for firing at ports 125 may be obtained from the furnace 145 by sending it through a gas storage reservoir. Connection for such purpose can be made to pipe 155.

Operation is as follows:

Crushed limestone ($CaCO_3$) is introduced into the hopper 55 via the skip hoist apparatus 63, 65, whenever the slide gate 67 is opened. When the gate is opened or closed, air cannot enter the system because the inlet gas-lock compartment 61 is internally pressurized with products of combustion (primarily $CO_2$ and $N_2$). When the door 67 is closed, the bell 57 is opened. Thus there will be a movement of crushed rock through the hollow cross wall 39.

In the hollow, foraminated wall 39 the stone is traversed by hot products of combustion, to become preheated. The stone then enters the opening 17 of the rotating drum 1, where preheating continues and calcination begins, and is pushed along by the flights 21 toward the space between the cross walls 23. These walls double the effectiveness of the open section of the drum 1. As the stone travels further down the drum it is picked up by the cross walls 25 for further complete exposure to radiant heat of the hot stream. Not all of it is calcined in the drum, its feed rate being substantial enough to avoid complete calcination in the drum. The surface layers of the uncalcined stone form a heat accumulator while in the drum. From the cross walls 25 the stone and calcined material descend to the lower opening 19 and drop into the calciner and storage unit 97, its flow being divided by the cross wall 109. Above the cross wall, some terminal calcination is effected by controlled heat from the firing ports 125. The rate of firing is adjustable at the fuel burner 127. Below the ports, calcination is finished by heat-soaking. Finished lime flows by feeder operation into the storage pit 129. From here, by operation of the control gate 135, it is admitted in any desired increments to the hood 141 when the furnace 145 is in the solid-line position. Excess lime may be drawn off through gate 137, to be used for other purposes.

As above made clear the waste-heat gases rising from furnace 145 through pipe 155 have their CO contents diluted with $CO_2$ from recirculating pipe 79 for tempering combustion in the drum 1, control in this respect being had by means of damper 189, fan 173 and damper 185. Temperature control of the recirculating gas is had by means of dampers 71 and 75.

The final products of combustion ($CO_2$, $N_2$ and trace gases) pass from the opening 17, through preheater 27 and then through the precipitator 49 to be exhausted by fan 53. The cooling effected by the water spray at 47 cools the gases passing to the precipitator. Some of these cooled gases are drawn off over pipe 73 to cool those abstracted over pipe 69 before the recirculating pipe 79 is entered. It is by this means that the temperature of the gas entering pipe 155 at connection 187 may be controlled.

Overburning in the terminal calcining portion 107 of the calciner 97 is prevented by proper control of the burner 127. Final calcination is effected by soaking action in the passages 113. Finished lime is stored in section 129 and provides a supply which may be drawn upon from time to time to furnish incremental applications of lime as needed by the furnace 145 when in its solid-line position.

The main control of the system is accomplished by means of dampers 52 and 185. Thus when it is desired not to have excesses of gas go through the drum 1, the damper 185 is more fully opened while damper 52 is more fully closed. On the other hand, when it is desired to increase gas flow through the drum 1, damper 52 is more fully opened and damper 185 is more fully closed. It will also be observed that when the furnace 145 is in its tilted recharging position, the damper 52 will be near its closed position while damper 185 will be more nearly open, so that cold air rising in the pipe 155 will not reach the drum 1. Moreover, when the furnace 145 is initially turned up and initially fired, it may still be desirable to maintain the damper 185 more nearly open and damper 52 more nearly closed. Thus dampers 52 and 185 are the main control features of the system. In general, the drum speed is increased as the volume and/or temperature of gas flow therethrough increases.

The flow of lime must be cut off at gate 135 from time to time, as for example when the furnace 145 is tilted to its dotted-line charging position. In this tilted position it is discharged and recharged with liquid steel, scrap and appropriate alloy materials, after which it is turned to the solid-line position for addition of the proper amount of lime from the outlet 131. Then the oxygen lance is inserted for firing. Lime may continue to be added in additional increments. A temperature of about 3,200° F. is desirable just inside the opening 19 of the drum 1, with about 2,000° F. at its upper opening 17. However, during firing of the furnace 145 a constant temperature is not maintained. During the early period of firing the temperature is too low and at a subsequent period it becomes too high, after which it again declines. During periods of excessively low temperature of gas from the furnace 145, such gas is diverted from nozzle port 157, being drawn over relief pipe 167 and sent through the relief system. This prevents undesirable cooling in the drum. Under such conditions the main damper 52 is nearly closed and rotation of the drum is reduced by controlling the speed of motor 7, so that calcination may continue by absorption of heat from the heat sink or accumulator action afforded by the previously heated bulk of the drum parts (including cross walls 23 and 25) and from the unfinished stone therein. Thus lime production from stone proceeds at a slower rate in the drum 1.

Under excessively high temperature conditions, the amount of recirculating gas from pipe 79 is increased so as to temper the hot gas from the furnace 145, thus holding the temperature down to the desired 3,200° F. inside the opening 19. In addition, if it is necessary some of the excessively hot gas in pipe 155 may be obstracted therefrom over the relief pipe 167. Moreover, the drum speed is increased to correspond to the increased rate at which the stone is reduced to lime at the higher temperature. During the high-speed operation at the proper higher temperature, the drum parts become reheated to act as a heat sink or accumulator for the next low-speed and low-temperature operation. It may be noted at this point that the temperature carried in the terminal calciner portion 107 is on the order of 2,000° F. Soaking in the soaking section 113 occurs at about 1,650° F. Any heat which arises from the assembly 97 into the drum is not of an amount to contribute to overheating, particularly in view of the fact that only about 15% of the total volume of lime calcined is calcined in the assembly 97. The remaining 85% of the lime is calcined in the rotary drum 1.

The above-mentioned control of optimum operating temperatures in the drum afforded by drum speed control, gas recirculation through pipe 79 and hot-gas relief through pipe 167 is important, not only from the standpoint that the firing temperatures of the furnace 145 are variable, but also from the viewpoint that the furnace 145 sometimes is supplying no heat at all. The furnace is in its solid-line heating position only about one-half the time of operation, the remaining one-half being occupied in its tilted position wherein it is discharged and recharged. In the latter case no heat is available from the furnace, yet it is not desirable that lime production shall entirely cease. In order effectively to continue production, the speed of the drum is again reduced. Heat for calcining during low-speed operation of the drum is obtained in part from the heat introduced at the burner 127 and in part from the storage of heat in the heavily insulated and basic brick walls of the drum and the stone contained therein.

Since the stone in the drum is intended to perform as a sink or accumulator for heat during high-speed operation and to release heat during slow-speed operation, the drum is designed for a heavy load content substantially higher than has been the usual practice in rotary kilns. While this results in an amount of uncalcined rock or uncalcined core material passing out of the lower drum opening 19, such material and rock become calcined in the terminal calciner section 107 and in the heat-soaking section 113. In general, the kiln should be heavily insulated, which is permissible because calcination is not completed in the drum 1, such as would ordinarily tend to destroy a refractory lining. The heavy load content is also demanded to obtain a large projected area for heat absorption by the stone-lime bed. This is necessary to obtain sufficient heat transfer for the large amount of lime produced.

Insulation, heavy load and high temperature operation are the more permissible because the kiln would not be under high heat continuously and only intermittently.

Figures 10, 11:
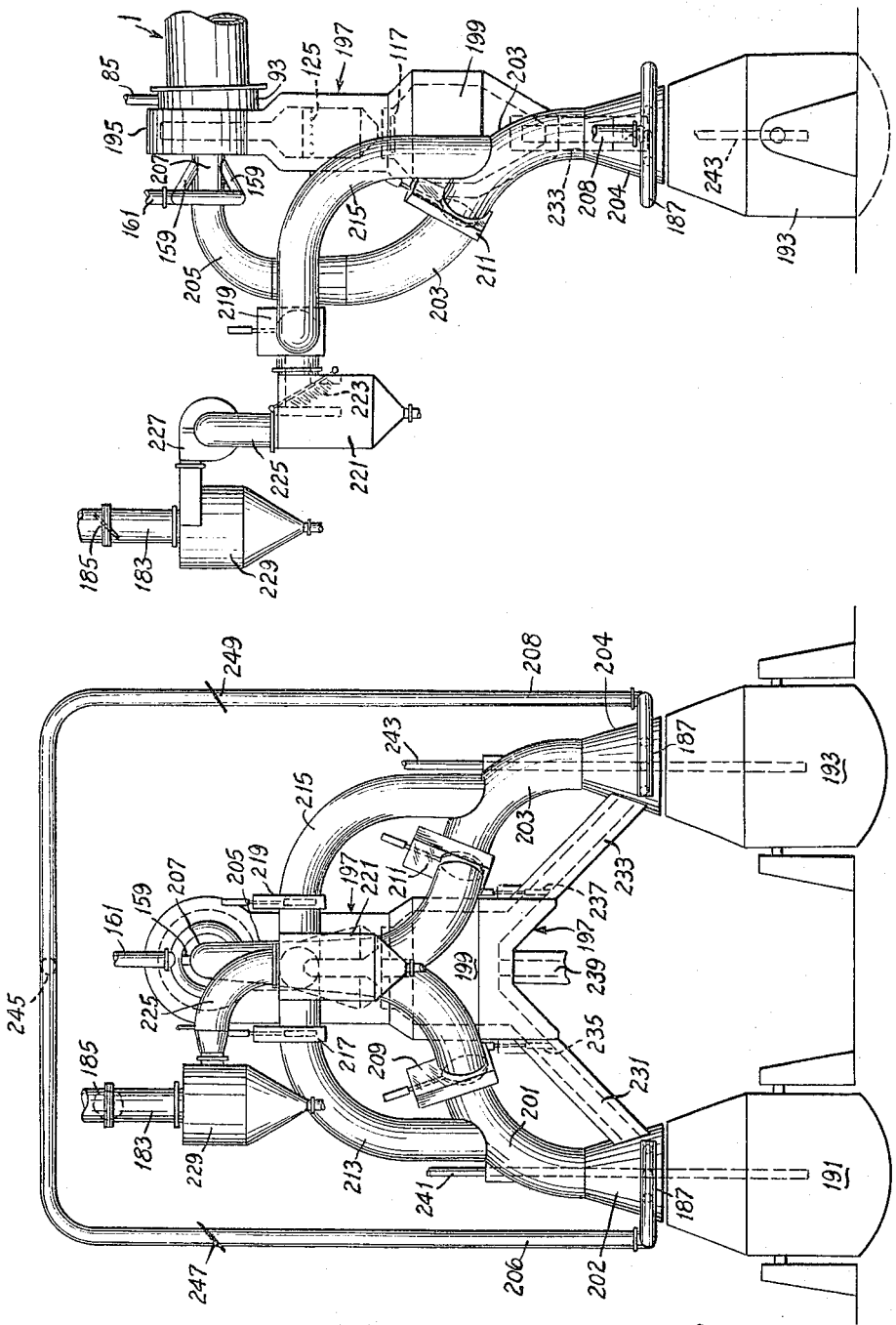
FIG. 10 is a left end elevation of a modified form of the invention.
FIG. 11 is a right side elevation of FIG. 10.

In FIGS. 10 and 11 is shown a modification incorporating several (two in the present example) furnaces, each like furnace 145 but renumbered as 191 and 193. In this embodiment, like numerals designate like parts. In this case the drum 1 is again shown as being connected with a hood 195 of a lime-finishing and storage assembly 197. This assembly is like the lime-finishing and storage assembly 97 except that it has a wider lower storage pit 199. Separate gas collector hoods 202 and 204 and gas offtake connections 201 and 203 are provided over the furnaces. These through a common offtake relief connection 205 join with the waste gas burner nozzle 207. In the connections 201 and 203 are control gates 209 and 211, respectively, adapted for alternate closings and openings as the furnaces 191 and 193 are tilted for recharging. Connected with the hoods 202 and 204 are recirculating gas pipes 206 and 208 which have connections with a common supply pipe 245. Pipe 245 corresponds to pipe 79 of the first form of the invention. In the pipes 206 and 208 are control valves 247 and 249, respectively. The pipes 201 and 203 also have connected offtake relief pipes 213 and 215, respectively. These contain control valves 217 and 219, respectively. Both feed into a common vessel 221 in which are water sprays 223. The vessel 221 has an exhaust connection 225 to a fan 227 which draws air through whichever pipe 213 or 215 has its respective valve 217 or 219 open, as the case may be. The fan 227 sends the gasses out through a collector 229.

The storage pit section 199 of the storage assembly 197 has two finished-lime outlets 231 and 233 which deliver lime to the furnaces 191 and 193, respectively. Control valves 235 and 237 are used in the connections 231 and 233, respectively. A central auxiliary lime withdrawal port is shown at numeral 239, which has in it a valve (not shown) in a lower part thereof which is broken away. Oxygen lances are shown at numerals 241 and 243, slidably organized with the pipes 201 and 203 for insertion into and withdrawal from the furnaces 191 and 193, respectively.

The operation of the alternative form of the invention is like that above described. Preferably, the furnaces 191 and 193 are alternately tilted for recharge. The controls 185, 217, 219, 209, 211, 235, 237, 247 and 249 are set so that at any given time only the one of the furnaces 191 or 193 which is upright is in operating connection with the drum 1 and the storage assembly 197. The various modes of controls above described provide for proper rates and temperatures of operation so that a high quality of lime is steadily produced to supply the furnaces 191 and 193 alternately and intermittently. It is also possible to operate the alternate form of the invention by tilting the furnaces 191 and 193 at the same time for recharge, the motor and control valves being set as required and as will be obvious to those skilled in the art.

It will be understood that while the various valves, blowers, burners, shakers and water sprays above referred to are indicated herein as being manually operable, in practice they may be constructed for automatic electric control. It will also be understood that well-known optional auxiliary features may be employed, such as lime screens in outlets such as 131, 133 (FIG. 5) or outlets 231 and 233 (FIG. 10). It may also be noted that the preheating cross wall 39 (FIGS. 3 and 4) and the preheating sector 23 are either or both optional. Even sector 25 may not be necessary, depending on heat available and lime required.

While the steel furnaces are described as being of the basic oxygen type, it will be understood that they may be of other types or may be other apparatus furnishing waste heat in the form of a combustible gas.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Lime-producing apparatus comprising a counterflow type of sloping rotatable drum assembly having an opening at each end, means for delivering stone into the drum at its upper end and for receiving spent gas therefrom, a receiver at the lower end of the drum for receiving stone from the drum and having a firing port for delivering gas thereto, a connection with said firing port for supplying air to the drum with combustible waste-heat gas of varying temperatures from a source of the same, a terminal calciner located below and connected with said receiver, said terminal calciner having an upper fuel- and air-fired terminal calcining section adapted to receive incompletely calcined stone with lime from the lower end of the drum, firing means in said upper section for further calcination, spent gases from the firing means passing to the drum, said terminal calciner also having a lower heat-soaking section for substantial completion of calcination, a storage section below said heat-soaking section, and means for rotating the drum assembly at comparatively high and low speeds according to comparatively high or low temperatures and volumes of said waste-heat gas but in either event at a speed to forestall any substantially complete calcination of stone to lime in the drum, the heat mass of the drum and of uncalcined stone therein being of an amount to absorb heat from the gas under high-speed high-temperature operation and to release heat under low-speed temperature operation.

2. Lime-producing apparatus comprising a counterflow type of sloping rotatable drum assembly having an opening at each end, upper housing means for delivering stone into the drum at its upper end and for receiving hot spent gas therefrom, a gas cooler connected with said upper housing means, a receiver at the lower end of the drum for receiving stone from the drum and having a firing port for delivering gas thereto, a waste-gas connection with said firing port for supplying air to the drum with combustible waste-heat gas of varying temperatures from a source of the same, a terminal calciner located below and connected with said receiver, said terminal calciner having an upper fuel- and air-fired terminal calcining section adapted gravitationally to receive incompletely calcined stone with lime from the lower end of the drum, firing means in said upper section for further calcination, spent gases from the firing means moving upward to the drum, said terminal calciner also having a lower heat-soaking section adapted gravitationally to receive incompletely calcined stone for substantial completion of calcination, a storage section below said heat-soaking section adapted gravitationally to receive finished lime, means for rotating the drum assembly at comparatively high and low speeds according to comparatively high or low temperatures of said waste-heat gas but in either event at a speed to forestall any substantially complete calcination of stone to lime in the drum, the heat mass of the drum and of uncalcined stone therein being of an amount to absorb heat from the gas under high-speed high-temperature operation and to release heat under low-speed low-temperature operation, and a spent-gas recirculating conduit extending from said upper housing means to said waste-gas connection.

3. Apparatus according to claim 2, including a connection for passing cool gas from the cooler to said recirculating conduit.

4. Apparatus according to claim 3, including a waste-gas relief passage communicating with said waste-gas connection.

5. A lime kiln for use with apparatus which produces waste heat in the form of a hot gas at variable temperatures, comprising a sloping rotatable drum having upper and lower end openings, means for rotating the drum at variable speed, a stone-feeder and spent-gas receiving means connected with the drum at the upper opening, a firing hood connected with the lower opening of the drum for the reception of material from the drum, a structure under said firing hood, said structure consisting of an upper terminal calciner connected with the hood and a lower storage pit connected with the calciner, air- and fuel-firing means in said upper calciner, a firing port in the hood opposite said lower drum opening, a conduit connected with said port for conveying said hot gas thereto, forced air inlet means connected with said port, and collector means adapted for the reception of gas from said apparatus and delivery to said conduit.

6. A lime kiln for use with apparatus which produces waste heat in the form of a hot gas of variable temperature, comprising a sloping rotatable drum having upper and lower end openings, variable-speed means for rotating the drum, stone-feeder and spent-gas-receiving means connected with the drum at the upper opening, a firing hood connected with the lower opening of the drum for the reception of material therefrom, a hollow material-receiving structure under said firing hood and in communication therewith, said hollow material-receiving structure comprising an upper terminal calciner and a lower storage pit, air- and fuel-firing means in said upper calciner, a firing nozzle in the hood opposite said lower opening, a conduit for said hot gas connected with said nozzle, forced-air inlet means connected with said nozzle, said conduit being provided with a collector adapted for the reception of waste heat from said apparatus.

7. A lime kiln according to claim 6 including a connection between said storage pit and said collector for conveying finished lime thereto.

8. A lime kiln for use with apparatus which produces waste heat in the form of a combustible gas, comprising a sloping rotatable drum having upper and lower end openings, means for rotating the drum at variable speeds, stone-feeder and spent-gas-receiving means connected with the drum at the upper opening, a firing hood connected with the lower opening of the drum for the reception of material therefrom, a hollow material-receiving structure under said firing hood and in communication therewith, said hollow material-receiving structure comprising a lower lime storage pit and a higher calcining chamber, said chamber being upwardly connected with said hood and downwardly with said pit, air- and fuel-fired ports in said chamber dividing it into an upper fired terminal calcining section and a lower heat-soaking calcining section, a firing nozzle in the hood opposite said lower opening, a waste-heat conduit connected with said nozzle, forced-air inlet means connected with said nozzle, said conduit being provided with a collector adapted for the reception of waste heat in the form of a combustible gas from said apparatus.

9. A lime kiln according to claim 8, including an outlet connection between said storage pit and said collector.

10. A lime kiln according to claim 8, including a spent-gas recirculating conduit connected with said stone-feeding and spent-gas-receiving means and said waste-gas conduit.

11. A lime kiln according to claim 8, including a waste-gas connection with said lower end opening of the drum for supplying air to the drum with combustible waste-heat gas of varying temperatures from a source of the same and a relief pipe connection with said waste-gas connection.

12. A lime kiln according to claim 8, including an outlet connection between said storage pit and said collector, a spent-gas recirculating conduit connected with said stone-feeding and spent-gas-receiving means and said waste-gas conduit, and a relief pipe connected with said waste-gas relief conduit.

13. A lime kiln according to claim 12, including a gas cooler connected to the outlet end of said stone-feeder and spent-gas-receiving means, and an auxiliary connection between said cooler and said recirculating gas conduit.

14. A lime kiln according to claim 13. including an electrostatic precipitator connected with said cooler, a stone hopper connected with said stone-feeder, stone inlet means for said hopper including a gas-lock chamber, a labyrinth seal between the upper end of the drum and the stone-feeder, a labyrinth seal between the lower end of the drum and said hood, and connections between said recirculating conduit, said gas-lock chamber and said labyrinth seals adapted to prevent inward leakage of air which might otherwise reach said precipitator.

15. Apparatus for manufacturing and supplying lime to a steel furnace, the furnace having intermittent periods of operation for steel production requiring lime and accompanied by the intermittent generation of hot combustible gas; comprising a counterflow type of sloping rotatable drum having an opening at each end, stone-feeding and spent-gas receiving means connected to its upper end and lime storage means connected to its lower end, means providing a firing port at said lower end, a gas conduit connected with said firing port adapted to carry intermittently produced hot gas from said furnace to the firing port as intermittently generated by the furnace, said lime storage means having a communication with the furnace including means for intermittent delivery of lime to the furnace, and a hot-gas relief connection with said conduit, said relief connection having a flow control therein.

16. Apparatus for manufacturing and supplying lime to a steel furnace, the furnace having intermittent periods of operation for steel production requiring lime and accompanied by the intermittent generation of hot combustible gas; comprising a counterflow type of sloping rotatable drum having an opening at each end, stone-feeding and spent-gas receiving means connected to its upper end and fuel-fired terminal calcining means connected to its lower end supplying spent gases to the drum, means providing a waste-gas firing port at said lower end, a waste-gas conduit connected with said firing port adapted intermittently to deliver hot gas from said furnace to the drum through the port, lime storage means for receiving lime from the terminal calcining means and having means communicating with the furnace adapted for intermittent delivery of lime thereto, and a hot-gas relief connection with said conduit, said relief connection having a flow control therein.

17. Apparatus for manufacturing and supplying lime to a steel furnace, the furnace having intermittent periods of operation for steel production requiring lime and accompanied by the intermittent generation of hot combustible gas; comprising a counterflow type of sloping rotatable drum having openings at its upper and lower ends, stone-feeding and spent-gas receiving means connected to its upper end and lime storage means connected to its lower end, means providing a firing port at said lower end, a hot-gas conduit connected with said firing port adapted to carry intermittently produced hot gas from said furnace to the drum through the port, said lime storage means having a communication with the furnace adapted for intermittent delivery of lime to the furnace, a spent-gas recirculating conduit forming a connection from said spent-gas receiving means and said hot-gas conduit, volume and temperature control means in said spent-gas conduit, a relief connection from said hot-gas conduit to the atmosphere, and volume control means therein.

18. Apparatus according to claim 17, including a terminal calciner between the lime storage means and upper opening of the drum.

19. Apparatus according to claim 18, including auxiliary fuel-firing means in the terminal calciner.

20. Apparatus of the class described, comprising a sloping rotatable drum having an opening at each end, stone inlet and gas outlet means at the upper end, a cooler in said gas outlet means, stone outlet and gas inlet means at the lower end, said stone outlet means comprising a terminal calciner assembly including a fuel-fired calcining section to form lime, a heat-soaking calcining section and a storage section, said storage section having an outlet for delivery of lime to a steel furnace, said stone outlet means having a firing port at the lower end of the drum, a hot-gas conduit for intermittently supplying waste combustible gas from said furnace to said firing port, a volume-controlled relief passage connected with said last-named conduit, a spent-gas recirculating pipe having volume-controlled connections with the gas outlet means on opposite sides of the cooler for temperature control of spent recirculation gases, said recirculating pipe being connected with said hot-gas conduit through volume control means.

21. Apparatus according to claim 20, including an electrostatic precipitator connected with said gas outlet means, running seals at the opposite open ends of the drum, a stone-feeder for said stone inlet means including an inlet gas-lock compartment, and means connecting said recirculation pipe with said running seals and said gas-lock compartment to prevent access of air to said precipitator.

22. Apparatus according to claim 20, including a stone preheater between said cooler and the upper end of the drum.

23. Apparatus according to claim 22, including an atmospheric relief connection with said hot-gas conduit, and volume control means therein.

24. Apparatus for manufacturing and supplying lime to a steel furnace, the furnace having intermittent periods of steel production accompanied by the generation of hot combustible gas; comprising a counterflow type of sloping rotatable drum having an opening at each end, stone-feeding means in communication with the drum at its upper end and a terminal calciner in communication with the drum at its lower end, means providing a firing port at said lower end, a hot-gas conduit connected with said firing port adapted intermittently to deliver hot gas from said furnace to the drum through the port, said terminal calciner having means communicating with the furnace for intermittent delivery of lime thereto, a spent-gas receiving means associated with the stone-feeding means, a spent-gas recirculating pipe connecting the spent-gas receiving means with said hot-gas conduit, volume and temperature control means for the recirculating gas, and a hot-gas relief passage connecting said conduit with the atmosphere and having a volume control device therein.

25. Apparatus according to claim 24, including a heat exchanger for spent gas from the drum and stone feed from said feeding means, said exchanger being positioned to abstract heat from the gas before any of it reaches said recirculating pipe.

26. In apparatus of the class described for supplying lime to a tilting basic oxygen steel furnace, a gas collector hood adapted to receive gas from the furnace when the furnace is in charged position, a conduit extending from said hood to the lower opening of the drum of a rotary lime kiln, and lime-finishing and storage means connected with said opening and having a lime outlet connection with said hood.

27. Apparatus according to claim 26, including an oxygen lance slidably supported in said hood for application to and withdrawal from said furnace.

28. Apparatus according to claim 26, including a gas relief connection to atmosphere from said conduit.

29. Apparatus according to claim 26, including an oxygen lance slidably supported in said hood for application to and withdrawal from said furnace, and including a gas relief connection to atmosphere from said conduit.

30. A lime kiln for continuous lime production and for use during such production with apparatus which produces waste heat in the form of a hot gas at variable temperatures in variable volume; comprising a sloping rotatable drum having upper and lower end openings, means for rotating the drum, a stone feeder and spent-gas suction connection at the upper drum opening, flow control means for said connection, a firing hood connected with the lower opening of the drum for the reception of material from the drum and having a port for delivery of said hot gas and air to the drum, a conduit connected with said port for conveying said hot gas thereto at variable temperature and volume, a suction-type gas relief connection with said conduit, and flow control means for said relief connection.

31. A lime kiln for continuous lime production and for use during such production with apparatus which intermittently produces waste heat in the form of a hot gas at variable temperatures in variable volume; comprising a sloping rotatable drum having upper and lower end openings, means for rotating the drum at variable speed, a stone feeder and spent-gas suction exhaust means connected at the upper opening, flow control means in said suction exhaust means, a firing hood connected with the lower opening of the drum for the reception of material from the drum and having a port for delivery of said hot gas and air to the drum, a conduit connected with said port for intermittently conveying said hot gas thereto at variable temperature and volume, a suction-type gas relief connection with said conduit, and flow control means for said relief connection.

References Cited by the Examiner
UNITED STATES PATENTS

| | | | |
|---|---|---|---|
| 2,653,809 | 9/1953 | Azbe | 263—32 |
| 2,794,631 | 6/1957 | Becker et al. | 266—13 |
| 2,799,492 | 7/1957 | Hobenreich et al. | 266—13 |
| 3,003,757 | 10/1961 | Mitchell | 263—53 |
| 3,139,463 | 6/1964 | Wuhrer | 263—53 |
| 3,159,386 | 12/1964 | Reonly et al. | 263—32 |
| 3,163,520 | 12/1964 | Collin et al. | 266—27 |
| 3,164,380 | 1/1965 | Kus | 263—32 |

JOHN F. CAMPBELL, *Primary Examiner.*

M. L. FAIGUS, *Assistant Examiner.*